United States Patent [19]

Uzaki et al.

[11] Patent Number: 4,923,831

[45] Date of Patent: May 8, 1990

[54] MAGNESIA-CALCIUM OXIDE REFRACTORIES

[75] Inventors: Nobuyuki Uzaki, Ako; Hiroaki Ishii, Okayama; Ichiro Tsuchiya, Ako; Yukio Oguchi, Himeji; Tatsuo Kawakami, Aioi, all of Japan

[73] Assignee: Kawasaki Refractories Company Ltd., Japan

[21] Appl. No.: 335,753

[22] Filed: Apr. 10, 1989

[30] Foreign Application Priority Data

Apr. 28, 1988 [JP] Japan ................................ 63-107291

[51] Int. Cl.$^5$ ............................................. C04B 35/04
[52] U.S. Cl. .................................... 501/108; 501/113; 501/121; 501/123
[58] Field of Search ................ 501/108, 113, 121, 123

[56] References Cited

U.S. PATENT DOCUMENTS

| | | | |
|---|---|---|---|
| 3,141,784 | 7/1954 | King et al. | 501/108 |
| 3,231,402 | 1/1966 | Leatham | 501/121 |
| 3,262,795 | 7/1966 | Davies et al. | 501/108 |
| 3,276,882 | 10/1966 | Buntenback et al. | 501/108 |
| 3,293,053 | 12/1966 | Alper et al. | 501/121 |
| 4,054,464 | 10/1977 | Thorn et al. | 106/100 |

Primary Examiner—William R. Dixon, Jr.
Assistant Examiner—Deborah Jones
Attorney, Agent, or Firm—Timothy R. Kroboth

[57] ABSTRACT

Disclosed are a magnesia-calcium oxide refractory product comprising (i) about 100 parts by weight of a refractory aggregate consisting essentially of about 20 to about 95% by weight of MgO and about 80 to about 5% by weight of CaO and (ii) about 0.5 to about 5 parts by weight of aragonite-type calcium carbonate, and a process for preparing the same.

5 Claims, No Drawings

MAGNESIA-CALCIUM OXIDE REFRACTORIES

FIELD OF THE INVENTION

The present invention relates to magnesiacalcium oxide refractory products outstanding in spalling resistance.

BACKGROUND OF THE INVENTION

Dolomite refractory products have been widely used for lining kilns such as LD converters, basic furnaces for steelmaking, cement rotary kilns or the like. Currently there is an increasing demand for development of refractory products improved in spalling resistance, impact resistance and the like in view of recent tendency for narrowly limited kiln conditions including, for example in case of LD converters, use of larger size converters, rise of temperature of molten steel to be withdrawn from a converter, reduction of refining time, etc.

To cater for this new situation, for example basic refractory products predominantly containing magnesia (hereinafter referred to as MgO) have been developed. The proposed refractory products are excellent in corrosion resistance to high-basicity slag but have the serious drawback of being poor in spalling resistance. Owing to low reactivity between MgO and slag, slag is caused to penetrate into a refractory brick until it reaches the brick region having a temperature corresponding to the melting point of slag. Since the penetrated layer of slag weakens the texture structure of MgO crystals (periclase) present in this brick region, the reduction of brick temperature induces physical differences (in thermal expansion coefficient, apparent porosity, strength and so on) between the penetrated layer and original layer, causing likelihood for spalling to occur. Because MgO has a high thermal expansion coefficient, spalling tends to take place also due to the difference of thermal expansion between the side of bricks facing the kiln interior (high-temperature side) and the rear side thereof (low-temperature side). In a kiln lined with MgO bricks, thermal spalling and structural spalling arise from a combination of various factors such as action of slag, thermal deformation due to kiln structure, thermal shock and mechanical impact afforded by operational cycles of kiln (cooling and heating cycle), etc. with the result that the lining bricks are gradually exfoliated, eventually making the kiln inserviceable.

To overcome said drawbacks of MgO bricks, it has been proposed to use zirconia (preferably stabilized zirconia)-containing MgO-calcium oxide (CaO) refractory bricks (see Japanese Unexamined Patent Publication No. 96005/1974). The proposed bricks have reportedly improved structural spalling resistance which is imparted due to the phenomenon that the penetrated slag reacts with zirconia near the brick surface to become highly viscous, thereby preventing further slag penetration. However, the fact is that the proposed refractory bricks achieve substantially no improvement in thermal spalling resistance.

MgO-CaO refractory products containing MgO, dolomite and CaO have been developed and frequently used. Although with high strength, these refractory products remain unsatisfactory in spalling resistance, thermal shock resistance, etc. Especially when this refractory product is used for lining a cement rotary kiln, the following disadvantage is entailed. In this case, a coating composed of cement is applied on the surface of refractory product in the burning zone of kiln in an attempt to extend the service life of refractory product. However, the coating is caused to intermittently form and fall off in a vigorous manner by rotation of the kiln or the like, whereby the surface of refractory product is subjected to strong thermal shock, causing spalling.

SUMMARY OF THE INVENTION

The main object of the present invention is to provide a magnesia-calcium oxide refractory product outstanding in thermal and structural spalling resistances.

Another object of the invention is to provide a magnesia-calcium oxide refractory product outstanding also in thermal shock resistance.

A further object of the invention is to provide a magnesia-calcium oxide refractory product outstanding in strength and other properties as well.

Other objects and features of the invention will become apparent from the following description.

This invention provides a magnesia-calcium oxide refractory product comprising (i) about 100 parts by weight of a refractory aggregate consisting essentially of about 20 to about 95% by weight of MgO and about 80 to about 5% by weight of CaO and (ii) about 0.5 to about 5 parts by weight of aragonite-type calcium carbonate.

We conducted extensive research to eliminate the prior art problems and found that the spalling resistance, thermal shock resistance and other properties of refractory products can be improved by adding to the MgO-CaO refractory materials a specific amount of aragonite-type calcium carbonate having a specific grain size without impairing the intrinsic excellent characteristics (high strength, etc.) of MgO-CaO refractory products. The present invention has been accomplished on the basis of this novel finding.

DETAILED DESCRIPTION OF THE INVENTION

Refractory aggregates useful in the invention include, for example, known basic refractory materials containing MgO and/or CaO. Specific examples of such aggregates are magnesia clinkers, dolomite clinkers, lime clinkers, etc. Magnesia clinkers include natural magnesia clinkers, synthetic sea water magnesia clinkers, electrofused magnesia clinkers, etc. Dolomite clinkers include natural dolomite clinkers, synthetic dolomite clinkers, electrofused dolomite clinkers, etc. The refractory aggregate to be used in the invention is at least one of these clinkers adjusted to a composition consisting essentially of about 20 to about 95% by weight of MgO and about 80 to about 5% by weight of CaO (hereinafter the percents by weight are simply referred to as %). Use of less than about 20% of MgO results in unsatisfactory slaking resistance and decreases the slag corrosion resistance, whereas an MgO content of over about 95% deteriorates the spalling resistance and slag penetration resistance. Useful refractory aggregates have a grain size of about 10 mm or less, preferably about 3 mm or less.

Aragonite-type calcium carbonates useful in the invention can be any of those heretofore known. When required, at least two of them may be used in mixture. When the components are fired for preparing the refractory products of the invention, the aragonite-type calcium carbonate is transformed into calcite-type one at a firing temperature of about 330° to about 480° C., causing rapid cubical expansion. This cubical expansion produces numerous microcracks within the brick. Our research revealed that the resulting microcracks prevent transmission of the stress induced during service, markedly effectively hindering propagation and growth of cracks due to thermal spalling. This remarkable effect in the invention can be accomplished only when aragonite-type calcium carbonate is used. When for example purified calcium carbonate (calcite-type CaCO₃) is used in place of aragonite-type calcium carbonate, merely spherical voids incapable of preventing growth of cracks are formed and thus the spalling resistance can be improved in no way. The amount of aragonite-type calcium carbonate used in the invention is about 0.5 to about 5 parts by weight per 100 parts by weight of the refractory aggregate (hereinafter the parts are all by weight). If the aragonite-type calcium carbonate content is less than about 0.5 part, the amount of microcracking occurring in the brick is too small to enhance the spalling resistance as contemplated. If the content is in excess of about 5 parts, the porosity is increased in brick structure, thereby imparting a reduced degree of refractoriness to the brick. There is no specific limitation on the grain size of aragonite-type calcium carbonate for use in the invention. Yet usually the grain size thereof ranges from about 0.5 to about 10 mm, preferably about 1 to about 3 mm. The grain size of less than about 0.5 mm tends to reduce the possibility of microcracking occurrence, whereas the grain size of more than about 10 mm is likely to increase the porosity by the cracks other than the microcracks, diminishing the contemplated effect of enhancing the spalling resistance. A preferred purity of aragonite-type calcium carbonate for use herein is about 80% or higher. When using a lower-purity aragonite-type calcium carbonate, a low melting point mineral material is produced, thereby impairing the refractoriness of the brick. Usable as aragonite-type calcium carbonate grains are crushed fragments of shells. In this case, it is possible to decrease the costs of materials by effective use of waste materials, hence advantageous.

The refractory products of the invention can be prepared by kneading, molding and firing a mixture of MgO-CaO refractory aggregate, aragonite-type calcium carbonate and a known nonaqueous binder added according to the conventional process such as tar, liquid phenolic resin, polyurethane, polypropylene, wax or the like (usually in an amount of about 1 to about 5 parts per 100 parts of the refractory aggregate). Detailed description of the process starting with addition of nonaqueous binder and ending with firing is omitted because the process is conventional. The firing is done preferably at a temperature of about 1600° to about 1700° C.

The magnesia-calcium oxide refractory products of the invention are useful as refractory materials for lining various kilns.

The magnesia-calcium oxide refractory products of the invention are superior to conventional magnesia-calcium oxide refractory products in spalling resistance and thermal shock resistance and are, moreover, comparable to or higher than the latter in strength and other properties.

Given below are working and comparison examples to clarify the features of this invention.

EXAMPLES 1 TO 3

A mixture of components as shown below in Table 1 in amounts (part) listed therein and polypropylene serving as a binder in an amount of 2 parts per 100 parts of the mixture components was kneaded, molded to a standard size and fired at a temperature of about 1650° C.

Given below are the type, grain size and composition of components used.
I. Natural magnesia clinker of 1 to 3 mm in grain size;
II. Natural magnesia clinker of 1 mm or less in grain size;
III. Natural dolomite clinker of 1 to 3 mm in grain size consisting essentially of 40% MgO and 60% CaO;
IV. Natural dolomite clinker of 1 mm or less in grain size consisting essentially of 40% MgO and 60% CaO; and
V. Aragonite-type calcium carbonate of 1 to 3 mm in grain size.

TABLE 1

| Component | Example 1 | Example 2 | Example 3 |
|---|---|---|---|
| I | 20 | 20 | 20 |
| II | 40 | 40 | 40 |
| III | 30 | 30 | 30 |
| IV | 10 | 10 | 10 |
| V | 1 | 3 | 5 |

The properties of the obtained refractory products were determined by the following methods.
A. Apparent porosity (%): According to JIS R 2205
B. Bulk density (g/cm³): According to JIS R 2205
C. Crushing strength (kgf/cm²): According to JIS R 2206:
D. Modulus of rupture (kgf/cm², 1400° C.): According to JIS R 2213: and
E. Spalling resistance:

The refractory product was placed in an electric furnace held at 1200° C. and working cycles each consisting of 15-minute heating and 15-minute air-cooling were repeated to determine the number of cycles involved until exfoliation of refractory product. Table 2 below shows the results.

COMPARISON EXAMPLE 1

A refractory product was prepared by repeating the same procedure as in Example 1 with the exception of not using the aragonite-type calcium carbonate. Table 2 also shows the results.

COMPARISON EXAMPLE 2

A refractory product was prepared by repeating the same procedure as in Example 1 with the exception of using purified calcite-type calcium carbonate (1 mm or less in grain size) in lieu of the aragonite-type calcium carbonate. Table 2 also shows the results.

TABLE 2

| Properties | Example 1 | Example 2 | Example 3 | Comparison Example 1 | Comparison Example 2 |
|---|---|---|---|---|---|
| A | 16.6 | 17.5 | 17.7 | 16.4 | 16.5 |
| B | 2.91 | 2.90 | 2.92 | 2.89 | 2.88 |
| C | 353 | 339 | 310 | 359 | 348 |
| D | 66 | 53 | 48 | 54 | 49 |
| E | >15 | >15 | >15 | 7 | 7 |

Table 2 shows that the magnesia-calcium oxide refractory product of the invention containing the aragonite-type calcium carbonate is markedly excellent in properties, especially in spalling resistance and thermal shock resistance, compared with conventional magnesia-calcium oxide refractory products free of the aragonite-type calcium carbonate.

The results in Table 2 also demonstrate that substantially no improvement was achieved by use of calcite-type calcium carbonate in place of the aragonitetype calcium carbonate.

We claim:

1. A magnesia-calcium oxide refractory brick made from a mixture consisting essentially of (i) about 100 parts by weight of a refractory aggregate consisting essentially of about 20 to about 95% by weight of MgO and about 80 to about 5% by weight of CaO, and (ii) about 0.5 to about 5 parts by weight of aragonite-type calcium carbonate.

2. A magnesia-calcium oxide refractory brick according to claim 1 wherein the refractory aggregate has a grain size of about 10 mm or less.

3. A magnesia-calcium oxide refractory brick according to claim 2 wherein the refractory aggregate has a grain size of 3 mm or less.

4. A magnesia-calcium oxide refractory brick according to claim 1 wherein the aragonite-type calcium carbonate has a grain size of about 0.05 to about 10 mm.

5. A magnesia-calcium oxide refractory brick according to claim 4 wherein the aragonite-type calcium carbonate has a grain size of about 1 to about 3 mm.

* * * * *